(12) United States Patent
Kulkarni et al.

(10) Patent No.: US 11,411,812 B2
(45) Date of Patent: Aug. 9, 2022

(54) DYNAMIC SERVICE CREATION FOR MICROSERVICE-BASED INTEGRATION SERVICE

(71) Applicant: SAP SE, Walldorf (DE)

(72) Inventors: Gopalkrishna Kulkarni, Bangalore (IN); Deepak Govardhanrao Deshpande, Bengaluru (IN)

(73) Assignee: SAP SE, Walldorf (DE)

( * ) Notice: Subject to any disclaimer, the term of this patent is extended or adjusted under 35 U.S.C. 154(b) by 130 days.

(21) Appl. No.: 16/742,004

(22) Filed: Jan. 14, 2020

(65) Prior Publication Data
US 2021/0218622 A1     Jul. 15, 2021

(51) Int. Cl.
| | |
|---|---|
| *H04L 41/0806* | (2022.01) |
| *H04L 9/40* | (2022.01) |
| *H04L 41/084* | (2022.01) |
| *H04L 67/00* | (2022.01) |
| *H04L 67/51* | (2022.01) |
| *H04L 67/60* | (2022.01) |

(52) U.S. Cl.
CPC ...... *H04L 41/0806* (2013.01); *H04L 41/0843* (2013.01); *H04L 63/0892* (2013.01); *H04L 67/34* (2013.01); *H04L 67/51* (2022.05); *H04L 67/60* (2022.05)

(58) Field of Classification Search
CPC ............. H04L 41/0806; H04L 63/0892; H04L 41/0843; H04L 67/32; H04L 67/34; H04L 67/16

USPC ......................................................... 709/223
See application file for complete search history.

(56) References Cited

U.S. PATENT DOCUMENTS

| | | | |
|---|---|---|---|
| 2012/0324069 A1* | 12/2012 | Nori ...................... | G06F 9/5066 709/222 |
| 2018/0081983 A1* | 3/2018 | Carru .................. | H04L 63/0815 |
| 2018/0083835 A1* | 3/2018 | Cole ....................... | H04L 41/12 |
| 2019/0317776 A1* | 10/2019 | Walsh .................... | G06N 20/00 |
| 2020/0272670 A1* | 8/2020 | Vaishnavi ............... | H04L 67/10 |
| 2020/0293341 A1* | 9/2020 | Shedigumme .......... | G06F 21/31 |

* cited by examiner

*Primary Examiner* — Meng Vang
(74) *Attorney, Agent, or Firm* — Buckley, Maschoff & Talwalkar LLC

(57) ABSTRACT

According to some embodiments, methods and systems may be associated with a microservice-based cloud computing environment. Model integration content may be received from an integration developer in connection with the cloud computing environment and at least one integration service may be determined associated with the received model integration content. A provisioning application platform may then automatically and dynamically instantiate the at least one integration service on demand during a provisioning process. Moreover, the provisioning application platform may also automatically subscribe the at least one integration service during the provisioning process. Similarly, at least one integration service to be consumed for received model integration content may be determined. The provisioning platform may then automatically instantiate that at least one integration service on demand during a consumption process. In this case, the provisioning application might automatically subscribe the at least one integration service during the consumption process.

10 Claims, 18 Drawing Sheets

US 11,411,812 B2

DYNAMIC SERVICE CREATION FOR MICROSERVICE-BASED INTEGRATION SERVICE

BACKGROUND

An enterprise may utilize a cloud computing environment to let users perform tasks. For example, the enterprise might let various users execute an application via the cloud computing environment to process purchase orders, adjust human resources information, generate invoices, etc. In some cases, the cloud computing environment will support multiple tenants and onboard applications using multiple microservices (e.g., one microservice might be associated with a user interface while another microservice handles database resources). Generally, a microservice-based integration service is onboarded or setup in the following stages:

- a system provisioning stage or process where a new datacenter is onboarded with all required microservices and resources;
- an application provisioning stage where a tenant administrator subscribes to an application (e.g., the integration service);
- a tenant onboarding stage that is triggered after the tenant administrator subscribes to the service (e.g., where resources will be created and bound to the required microservices); and
- a consumption stage where an integration developer consumes the application.

In some cases, a Cloud Platform Integration ("CPI") may act as middleware for applications or systems in integration scenarios. Note that an integration scenario may involve sender and/or receiver systems along with a sequence of steps to convert, enrich, and/or modify data flowing though the different systems. An integration flow developer may, for example, be responsible for manually defining an integration scenario using CPI web tooling, such as a design service. Once the integration scenario is complete, it may be built and deployed (e.g., using a generation and build service) on the tenants of the appropriate account in the cloud platform.

A functional limitation of CPI may be associated with connectivity to an on-premise system using a cloud connector and/or a connectivity service. In enabling the connectivity service for CPI, a limitation may be manifested in the context of create-service-instance-on-demand using a service creator. For example, in a microservice-based solution the service is typically created and instantiated as a separate step prior to the provisioning of a service (e.g., a person manually runs a command before the provisioning is initiated). Such a manual process, however, may introduce multiple errors and result in a failure of service provisioning.

It would therefore be desirable to provision an application of a multi-tenant, microservice architecture-based integration service for a cloud computing environment setup in a secure, automatic, and efficient manner.

SUMMARY

According to some embodiments, methods and systems may be associated with a microservice-based cloud computing environment. Model integration content may be received from an integration developer in connection with the cloud computing environment and at least one integration service may be determined associated with the received model integration content. A provisioning application platform may then automatically and dynamically instantiate the at least one integration service on demand during a provisioning process. Moreover, the provisioning application platform may also automatically subscribe the at least one integration service during the provisioning process. Similarly, at least one integration service to be consumed for the received model integration content may be determined. The provisioning platform may then automatically instantiate the at least one integration service on demand during a consumption process. In this case, the provisioning application might automatically subscribe the at least one integration service during the consumption process.

Some embodiments comprise: means for receiving model integration content from an integration developer in connection with the cloud computing environment; means for determining at least one integration service associated with the received model integration content; means for automatically and dynamically instantiating, by a provisioning application platform, the at least one integration service on demand during a provisioning process; and means for automatically subscribing the at least one integration service during the provisioning process.

Other embodiments comprise: means for receiving model integration content from an integration developer in connection with the cloud computing environment; means for determining at least one integration service to be consumed for the received model integration content; means for automatically and dynamically instantiating, by a provisioning application platform, the at least one integration service on demand during a consumption process; and means for automatically subscribing the at least one integration service during the consumption process.

Some technical advantages of some embodiments disclosed herein are improved systems and methods to provision the provision of an application for a multi-tenant, microservice architecture-based integration service associated with a cloud computing environment setup in a secure, automatic, and efficient manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
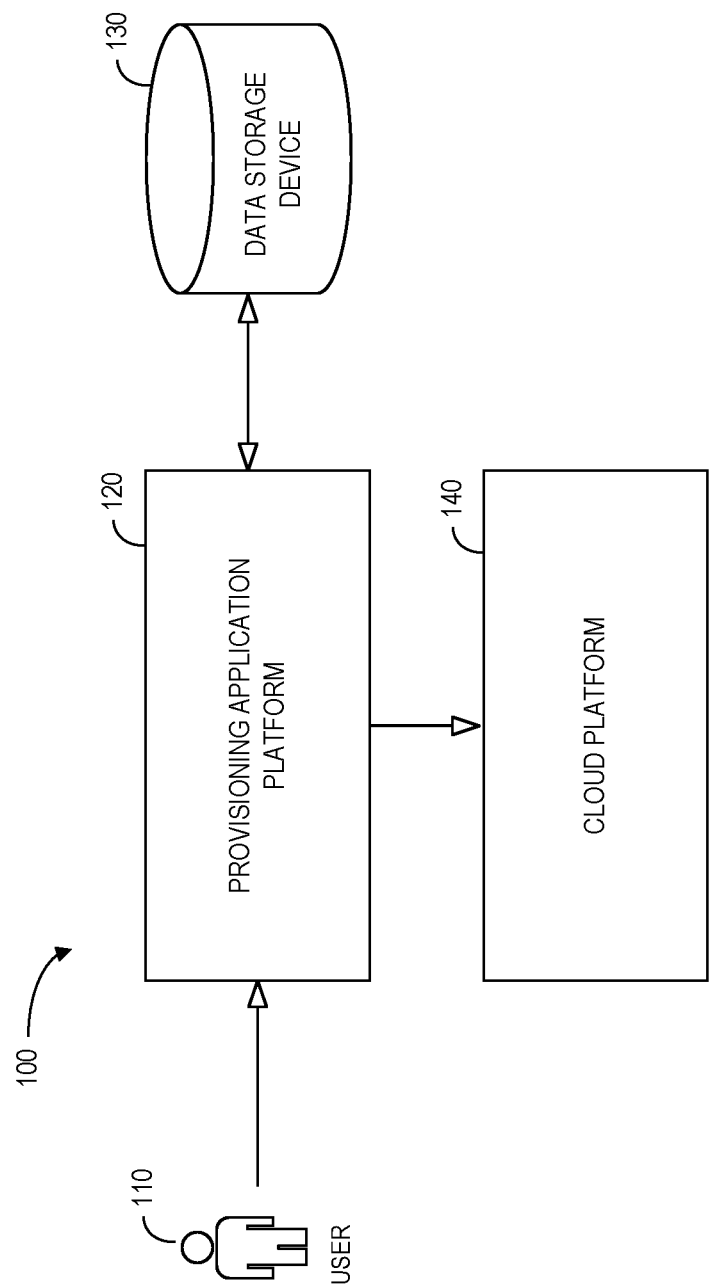
FIG. 1 is a high-level block diagram of a system in accordance with some embodiments.

As previously described, a microservice-based integration service is typically created and instantiated as a separate step prior to the provisioning of a service (e.g., a person manually runs a command before the provisioning is initiated). Moreover, this manual process may introduce multiple errors and result in a failure of service provisioning. To avoid this, FIG. 1 is a high-level block diagram of a system 100 in accordance with some embodiments. The system 100 includes a provisioning application platform 120 that accesses user entitlement information in a data storage device 130. The provisioning application platform 120 might use this information, for example, to create an integration service for a user 110 associated with a tenant or customer. The provisioning application platform 120 may communicate with cloud platform to create an integration service from microservices. The process might be performed automatically or be initiated via a command from a remote operator interface device. As used herein, the term "automatically" may refer to, for example, actions that can be performed with little or no human intervention.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The provisioning application platform 120 may store information into and/or retrieve information from various data stores (e.g., the data storage device 130), which may be locally stored or reside remote from the provisioning application platform 120. Although a single provisioning application platform 120 cloud platform 140 are shown in FIG. 1, any number of such devices may be included. Moreover, various devices described herein might be combined according to embodiments of the present invention. For example, in some embodiments, the data storage device 130 and the provisioning application platform 120 might comprise a single apparatus. The system 100 functions may be performed by a constellation of networked apparatuses, such as in a distributed processing or cloud-based architecture.

A user or administrator may access the system 100 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to define how microservices interact) and/or provide or receive automatically generated recommendations or results from the system 100. In some cases, a cloud platform integration may be built using a microservice architecture (e.g., and the underlying cloud platform 140 may comprise CLOUD FOUNDRY®).

Figure 2:
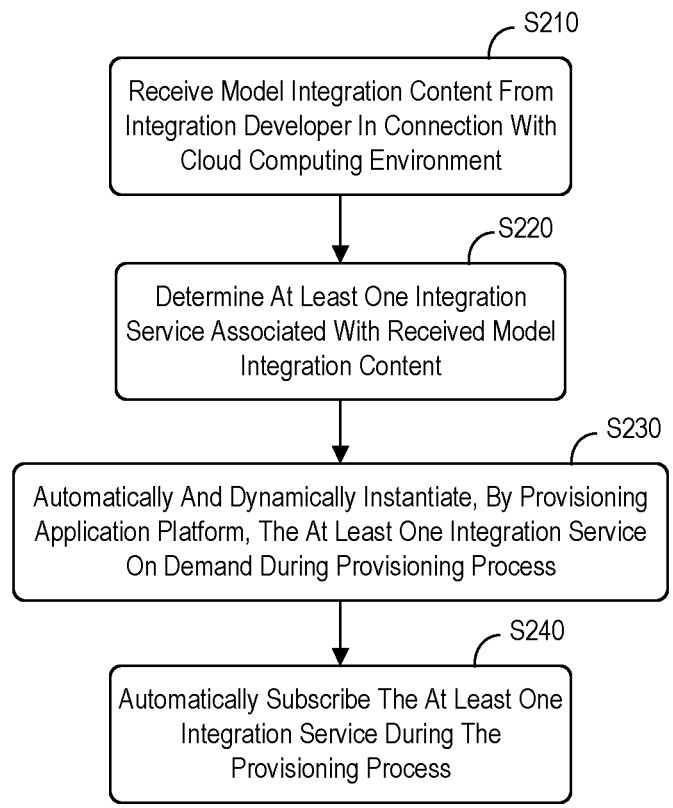
FIG. 2 is a method according to some embodiments.

FIG. 2 is a method that might performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, model integration content may be received from an integration developer in connection with the cloud computing environment. According to some embodiments, the model integration content is associated with an application to be executed in the microservice-based cloud computing environment. For example, the microservice-based cloud computing environment might comprise a multi-tenant cloud computing environment, the integration developer may be associated with a first tenant, and the application can then be executed for the first tenant. Note that the model integration content might be received via a user interface design service.

At S220, at least one integration service associated with the received model integration content is determined. In some embodiments, the at least one integration service is determined based on an integration artifact store. Moreover, the at least one integration service might also be further determined based on an on-demand service instance creator (e.g., including a service identifier and service name contributors).

At S230, a provisioning application platform may automatically and dynamically instantiate the at least one integration service on demand during a provisioning process. According to some embodiments, the provisioning process is associated with tenant resource manager. The system may then automatically subscribe the at least one integration service during the provisioning process at S240. In some embodiments, a cloud controller, coupled between the provisioning application platform and a cloud platform, automatically handles at least one subscription for the at least one integration service.

Figure 3:
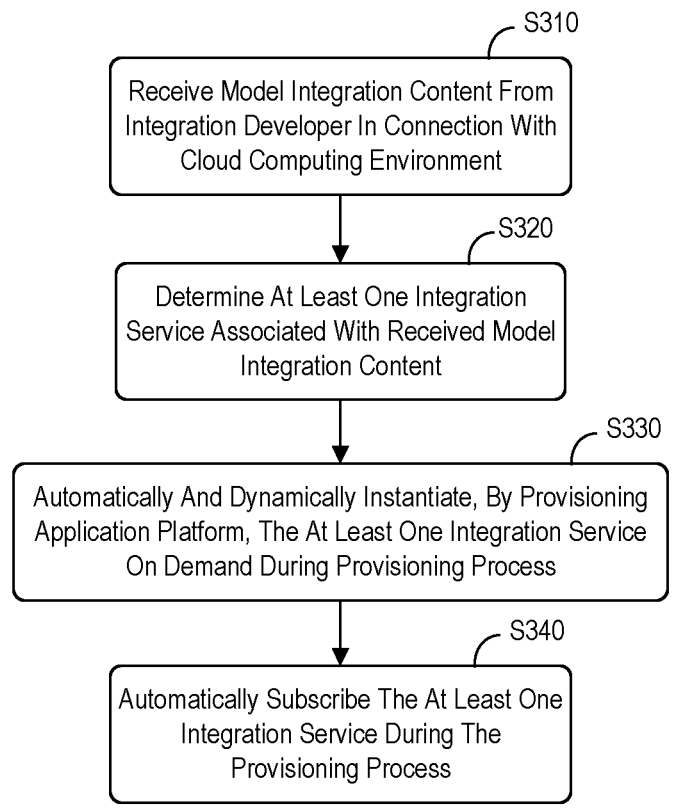
FIG. 3 is another method in accordance with some embodiments.

FIG. 3 is another method in accordance with some embodiments. As before, model integration content may be received from an integration developer in connection with the cloud computing environment at S310. At S320, at least one integration service to be consumed for the received model integration content may be determined. At S330, a provisioning application platform automatically and dynamically instantiates the at least one integration service on demand during a consumption process. The system may then automatically subscribe the at least one integration service during the consumption process at S340.

Figure 4:
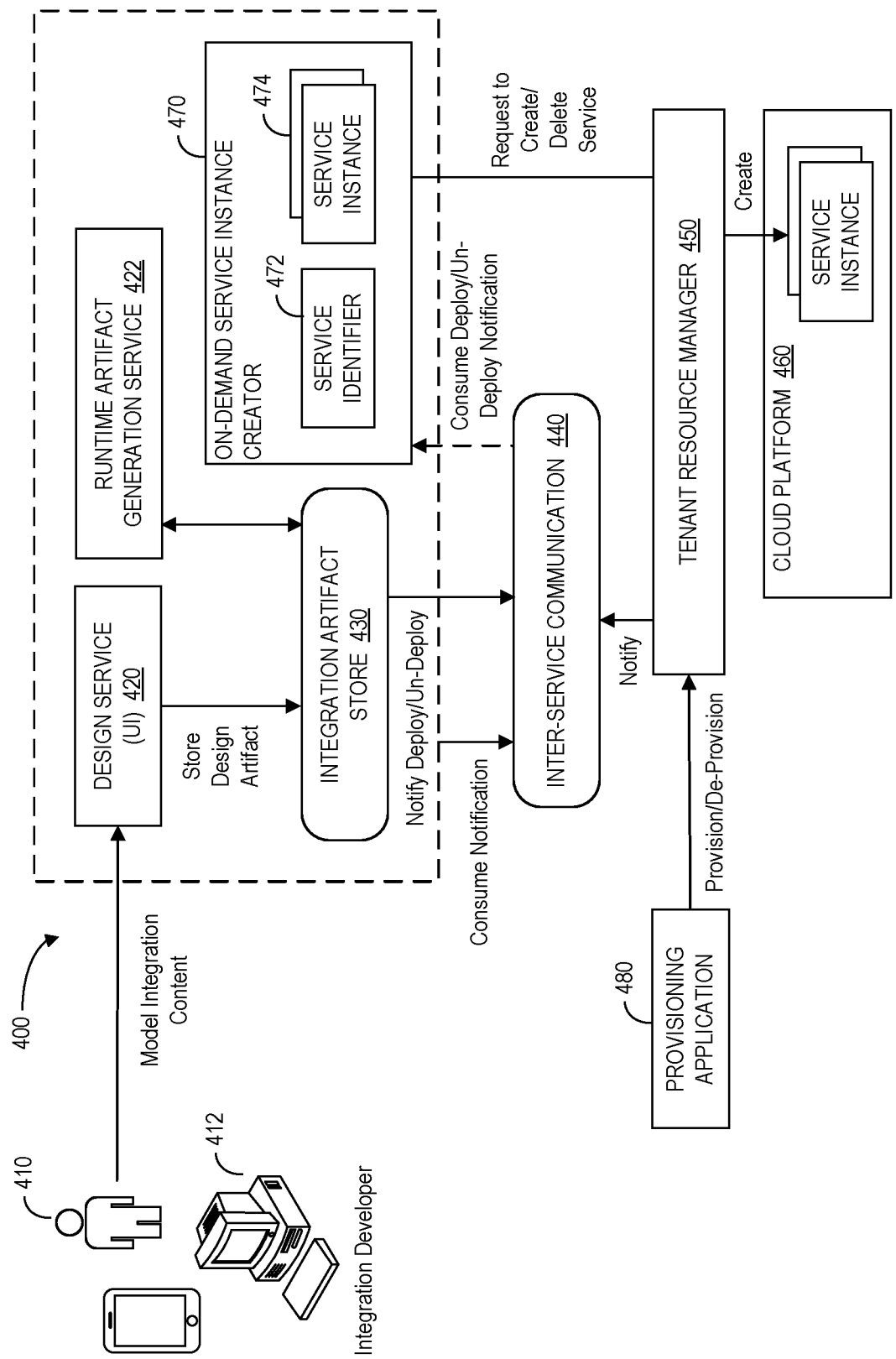
FIG. 4 illustrates a system that uses a service initiator in the context of a cloud computing environment in accordance with some embodiments.

As a result, embodiments may provide dynamic service creation for a multi-tenant microservice-based integration service. FIG. 4 illustrates a system 400 that uses a service initiator in the context of a cloud computing environment in accordance with some embodiments. The system 400 utilizes a service creator in the context of CPI, but such an approach can be further generalized to any service provider and consumer on a cloud platform. An integration developer 410 may provide model integration content to a design service 420 (e.g., a user interface). The design service 420 and/or a runtime artifact generation service 422 may be used by an integration artifact store 430 to generate deploy (or un-deploy) consumption notifications for a Tenant Resource Manager ("TRM") 450 via inter-service communication 440. An on-demand service instance creator 470 (e.g., including a service identifier 472 and service instances 474) and a provisioning application 480 may also exchange information with the TRM 450 to create service instances on a cloud platform 460 as appropriate.

Figure 5:
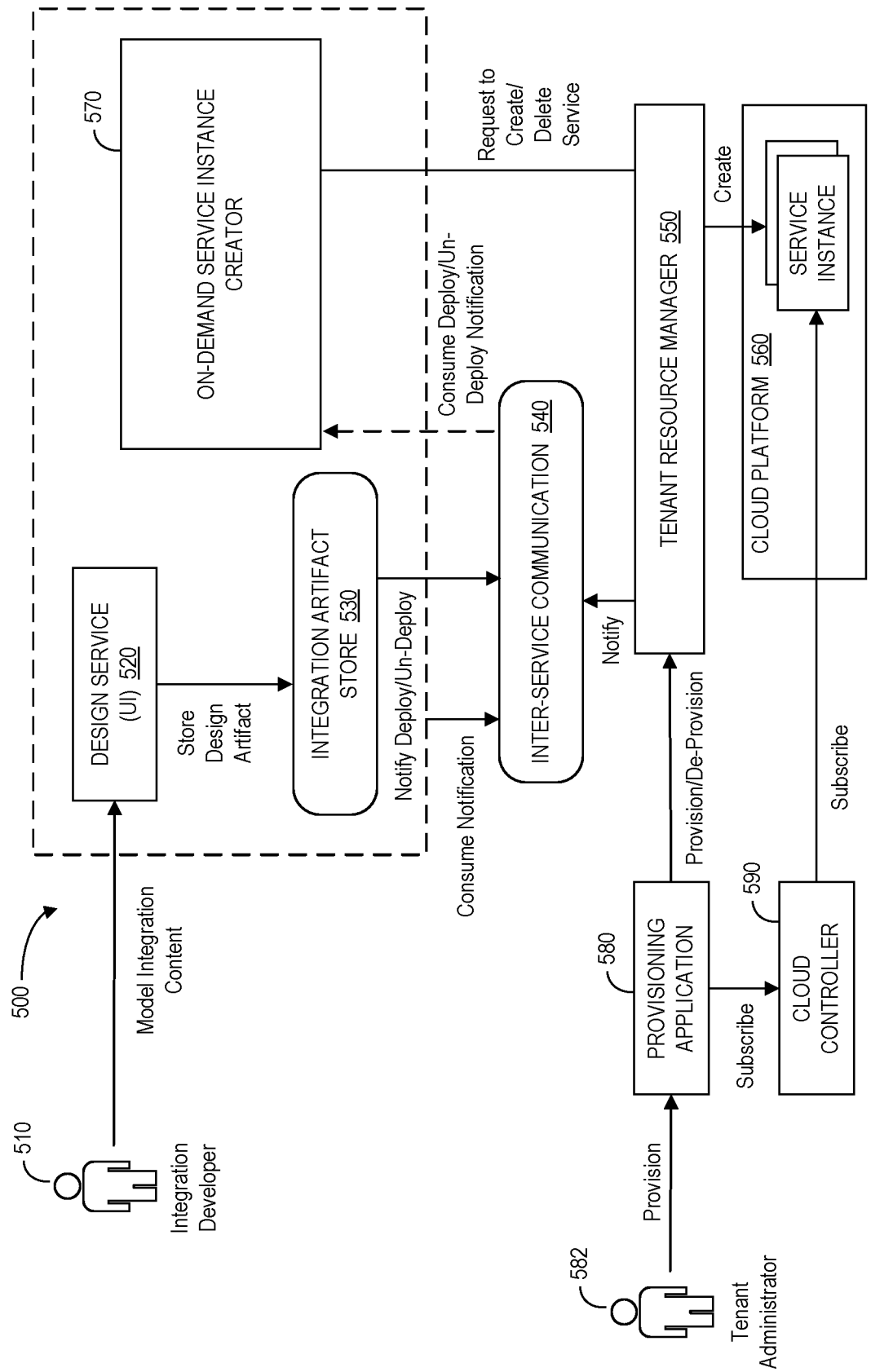
FIG. 5 illustrates a system with a cloud controller according to some embodiments.

FIG. 5 illustrates a system 500 with a cloud controller according to some embodiments. As before, an integration developer 510 may provide model integration content to a design service 520. The design service 520 may be used by an integration artifact store 530 to generate deploy (or un-deploy) consumption notifications for a TRM 550 via inter-service communication 540. An on-demand service instance creator 570 and a provisioning application 580 may also exchange information with the TRM 550 to create service instances on a cloud platform 560 as appropriate. In this example, a cloud controller 590 may be coupled between the provisioning application 580 and the cloud platform 560 to automatically facilitate on-demand subscriptions for the service instances.

Note that a cloud connector may be required for communication to on-premise systems from cloud applications. The cloud connector might be used, for example, in various scenarios that include adapters (components let the system fetch data from a customer network. The cloud connector might be be bound with the account ID of an application and used in the integration flow. It may let a system administrator define an external Uniform Resource Locator ("URL") to connect to the on-premise systems and hence act as a reverse proxy to route incoming calls to the appropriate system. In a Neo platform, cloud connector proxy routes the calls to the right instance which is configured in the invoking customer account. The applications running in an open-source, community driven platform for decentralized applications (e.g., NEO) may be made aware about this proxy and hence the invocation can be simple. According to some embodiments, the same approach may be used in a Cloud Foundry ("CF") platform (using an abstraction layer).

In NEO, the details about the proxy is made available to the applications via a certain environment variable and, hence, each feature that was using cloud connector could implement an appropriate mechanism to obtain the connectivity details. Moreover, the way to retrieve the information is simply and no abstraction is required. Unfortunately, the details that are used for connecting to the cloud connector may be platform dependent and, hence, the situation may be different in CF. In CF, the proxy details come from a connectivity that needs to be bound to a customer account. This connectivity service provides the system with the proxy host and proxy port, along with which the system must provide an additional header to maintain trust between the customer account and the connectivity service. When a system needs to support both CF and NEO platforms, it needs to have an abstraction. Note that each node and service may be associated with features, such as a platform (e.g., NEO or CF), a container (e.g., a Java 2 Enterprise Edition ("J2EE") or an Open Services Gateway initiative ("OSGi") standard), tenancy (single or multi-tenant service), feature symmetry, etc.

There may exist a connectivity service that exposes an on-premise proxy port. Using the client ID and client secret of the connectivity service along with a User Account and Authentication ("UAA") URL, the system can identify the zone of the subscriber. Hence, to maintain trust between the customers sub-account and the connectivity instance, the system may need an additional "Proxy Authorization" header. This proxy authorization header is the access token obtained from the UAA token URL with authentication from connectivity service. Without this header, the cloud connector responds with a status code "407" (proxy authentication required).

Figure 6:
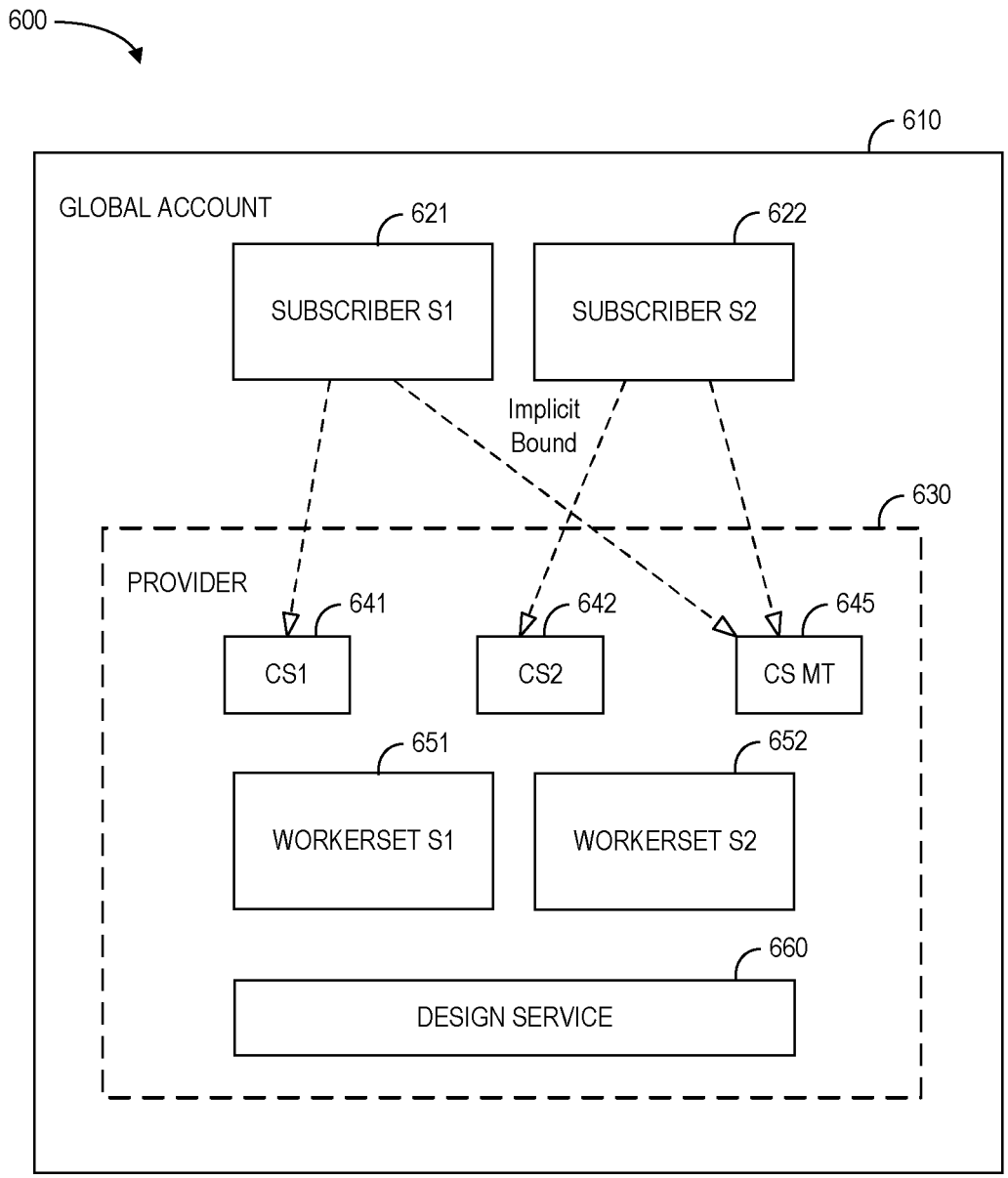
FIG. 6 is a system with a global account in accordance with some embodiments.

FIG. 6 is a system 600 with a global account 610 in accordance with some embodiments. A first subscriber "S1" 621 and a second subscriber "S2" 622 may access a provider 630. The provider may include CS1 641, CS2 642, CS MT 645, workerset "S1" 651, workerset "S2" 652, and a design service 660. Note that the system 600 may want two instances of connectivity service in CF, one for multi-tenant ("MT") applications (the design service 660) and the other for tenant specific services (worksersets 651, 652). Having one connectivity service for all of the applications might introduce security issues. For example, with help of a script step one may be able to reach another tenant's cloud connector. However, the concern exists with the worksersets 651, 652 only (which is tenant specific) not with the other (multi-tenant) services. Hence, to avoid the security issue and also to ease the connectivity service look up, each customer subaccount may be bound to two instances of connectivity services which is done during customer subscription. The provisioning application gets a callback at "getDependencies" route to provide dependent services to which the tenant should subscribe. Note that the multi-tenant connectivity service does not need to be created as it is done during system provisioning. The tenant-specific connectivity service, however, has to be created during the getDependencies( ) callback. Unfortunately, the getDependencies( ) callback might not have the information about the subscriber who has originated the call. Further note that the getDependencies( ) callback may carry a subscribing account's ID. This may be used by a provisioning application to create a tenant specific connectivity service.

Also note that the getDependencies( ) timeout is approximately 30 s. In other words, all of the dependencies must be returned before this period expires or the subscription will fail. This may make it difficult for the TRM to keep integrity on tenant provisioning. As a result, the following approach may be better for TRM and provisioning:

1. Customer onboards himself/herself to the CPI application;

2. At the first getDependencies( ) call, maintain the status of the customer using the tenantId;

3. Update subscription call completes;

4. Customer goes to the provisioning application and clicks on "Provision";

5. During provisioning, a new instance of connectivity service is created for the specified tenant whose details shall be stored in the database of provisioning application; and 6. Next, update dependencies may be called which will invoke getDependencies( ) once again. It is easy (and not time consuming) to return a tenant specific connectivity service and a multi-tenant connectivity service (used by multi-tenant services such as the design service).

To provision connectivity service, the TRM during tenant provisioning would have to create a connectivity service instance and then call an update dependency service on the CIS. This returns a job ID and the TRM needs to poll it until the job is successful or failed. The CIS then calls getDependency on the provisioning application which calls the TRM with tenantId and the TRM returns the connectivity service instance xsappname and the provisioning application returns it back to the CIS. The CIS can then call a subscription endpoint with event type="UPDATE" (and the provisioning application will return the same GoToApplicationURL that it returned during tenant subscription). On advantage of such an approach is that the TRM can initiate a tenant rollback directly when the update dependency fails. Note, however, that a getDependency call may timeout within 30 seconds, and within that time the provisioning application needs to make two calls, one to get OAuth token to invoke TRM and then another call to the TRM to get the tenant dependencies (which might result in a timeout).

Figure 7:
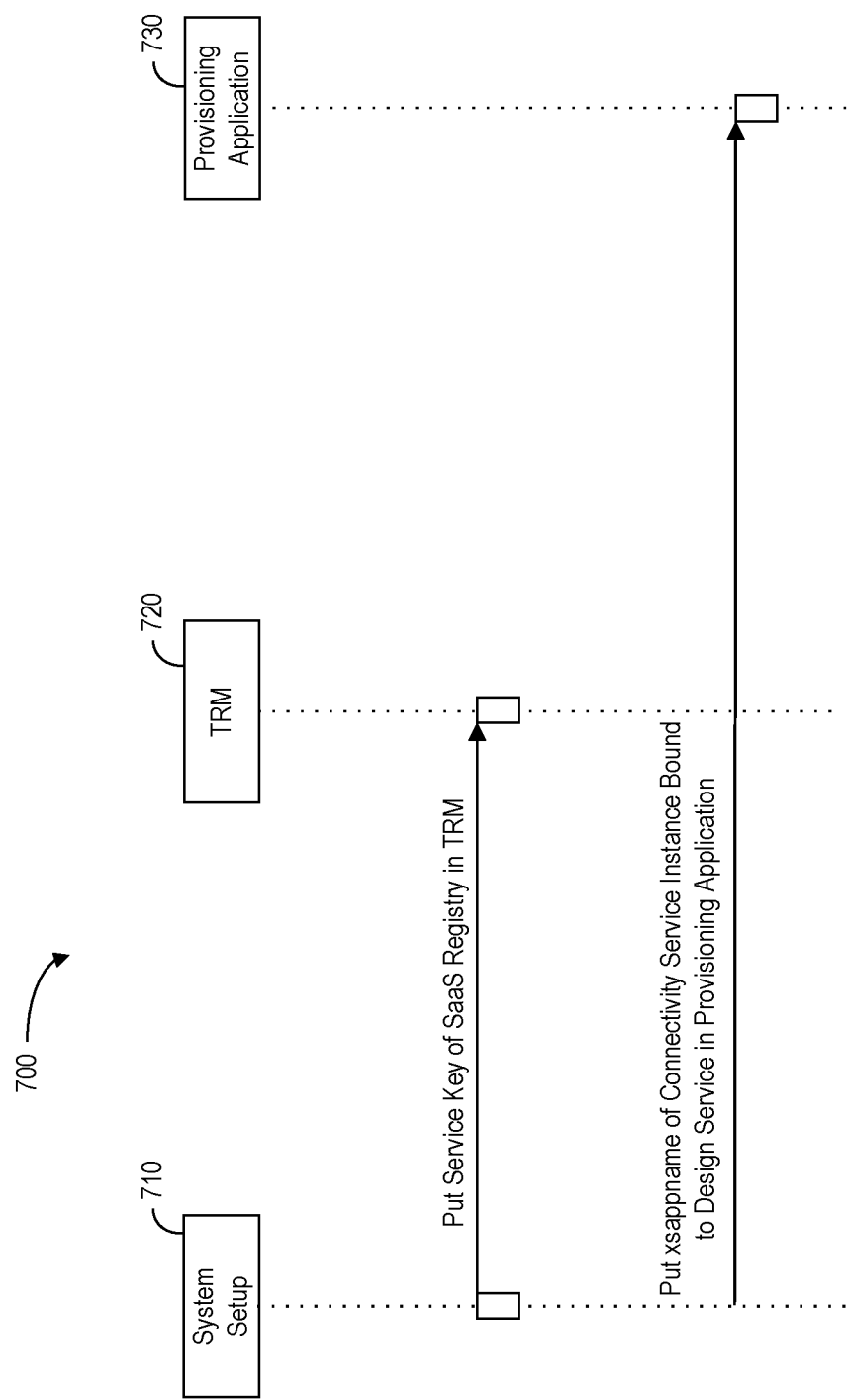
FIG. 7 is a system setup information flow diagram according to some embodiments.

FIG. 7 is a system setup information flow diagram 700 according to some embodiments. A system setup 710 may put a service key of a Software as a Service ("SaaS") registry in a TRM 720. The system setup 710 may also put an xsappname of a connectivity service instance bound to a design service in a provisioning application 730.

Figure 8:
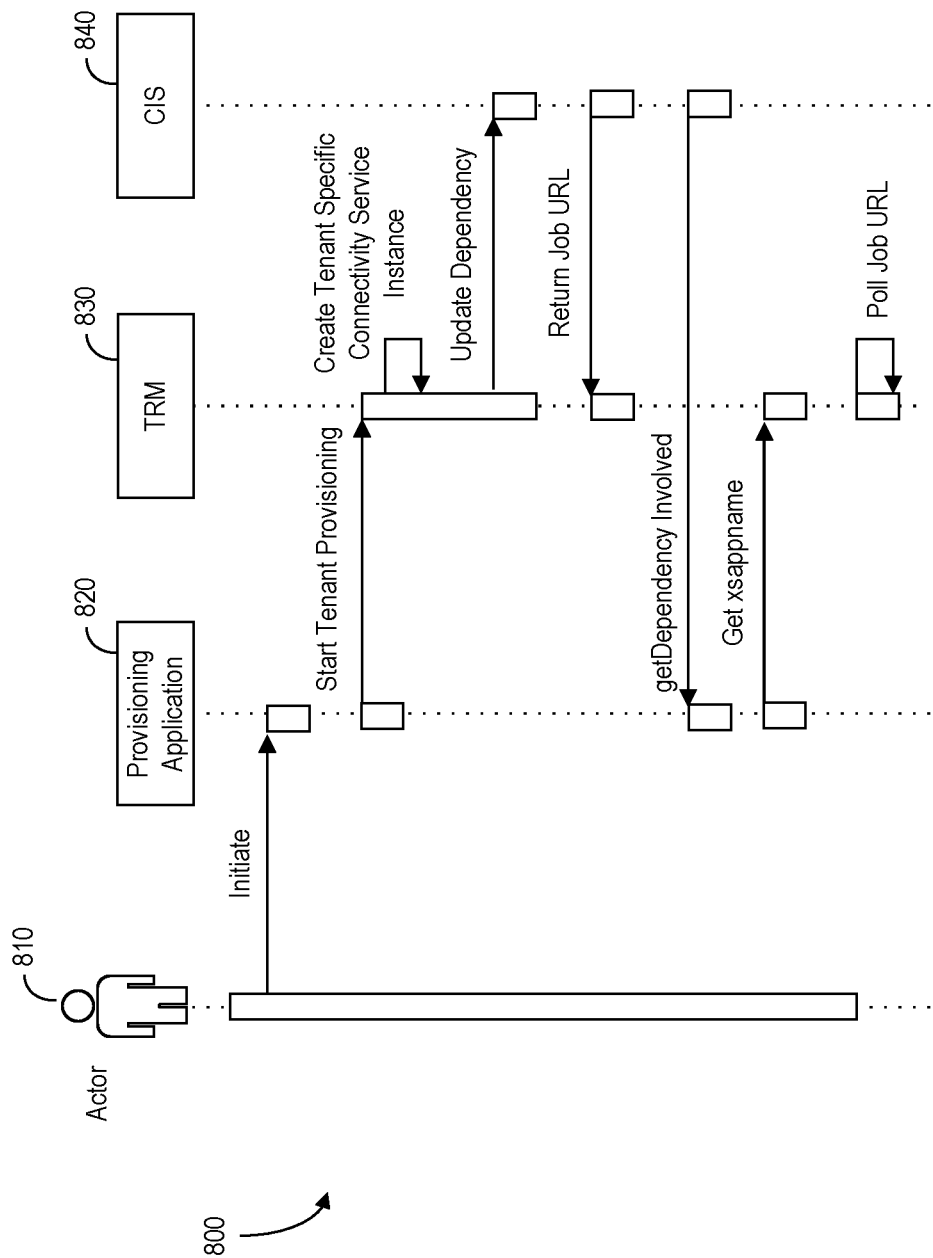
FIG. 8 is a provisioning information flow diagram in accordance with some embodiments.

FIG. 8 is a provisioning information flow diagram 800 in accordance with some embodiments. In this case, an actor 810 initiates tenant provisioning to a provisioning application 820. This causes the provisioning application 820 to start tenant provisioning with a TRM 830. The TRM 830 creates a tenant specific connectivity service instance and updates the dependency to a CIS 840. The CIS 840 returns a job URL to the TRM 830 and invokes getDependency to the provisioning application 820. At this point, the provisioning application 820 gets xsappname of the connectivity service in connection with the TRM 830. The TRM 830 then polls the job URL returned by the CIS 840. If successful, the process continues. If unsuccessful (i.e., "FAILED"), a roll back is performed.

Figure 9:
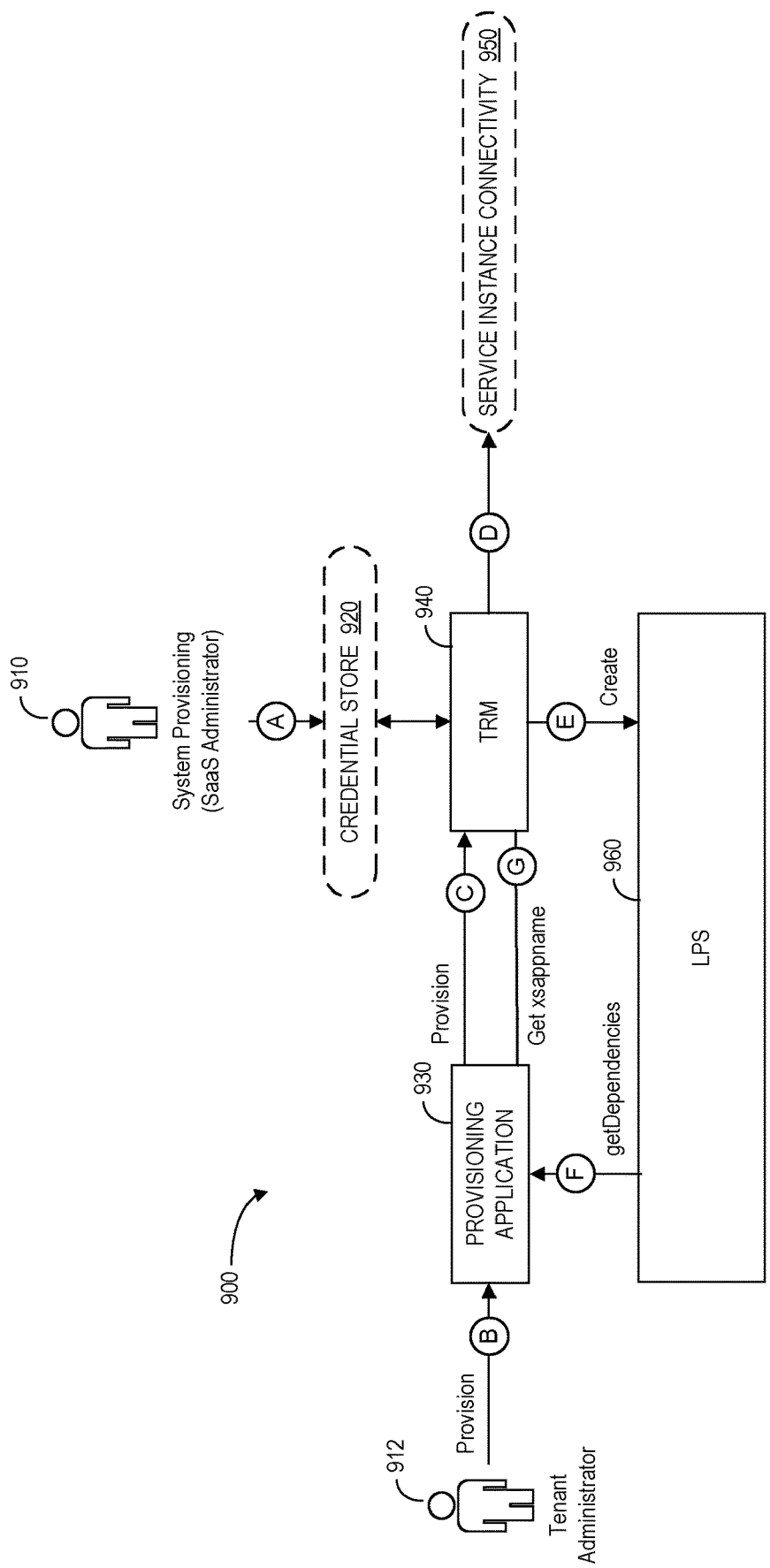
FIG. 9 is a system for provisioning and administration according to some embodiments.

FIG. 9 is a system 900 for provisioning and administration according to some embodiments. At (A), a system provisioning party 910 (e.g., associated with an SaaS administrator) may enter a service key to a credential store 920 (that exchanges information with a TRM 940). At (B), a tenant administrator 912 may send an indication of provision to a provisioning application 930. At (C), the provisioning application 930 may then send an indication of provision to the TRM 940. At (D), the TRM 940 may sent a create signal to a service instance connectivity 950. At (E), the TRM also sends a create signal to an LPS 960 causing the LPS 960 to send information to the provisioning application 930 in connection with getDependency. The provisioning application 930 may the get xsappname via the TRM 940.

The system setup responsibilities may include creating a connectivity service instance and binding it to a design service. Moreover, the xsappname of the connectivity service should be seeded to a provisioning application. In addition, the system may seed the service key and/or credentials of the SaaS registry into a TRM.

The TRM responsibilities include having the TRM create tenant specific connectivity service instance during tenant provisioning. Note that the TRM would initiate update dependency during tenant provisioning after the connectivity service instance is created. In some cases, an API contract to initiate update dependency may comprise an SaaS application registration in:

CF#Updatesubscriptiondependencies

Figure 10:
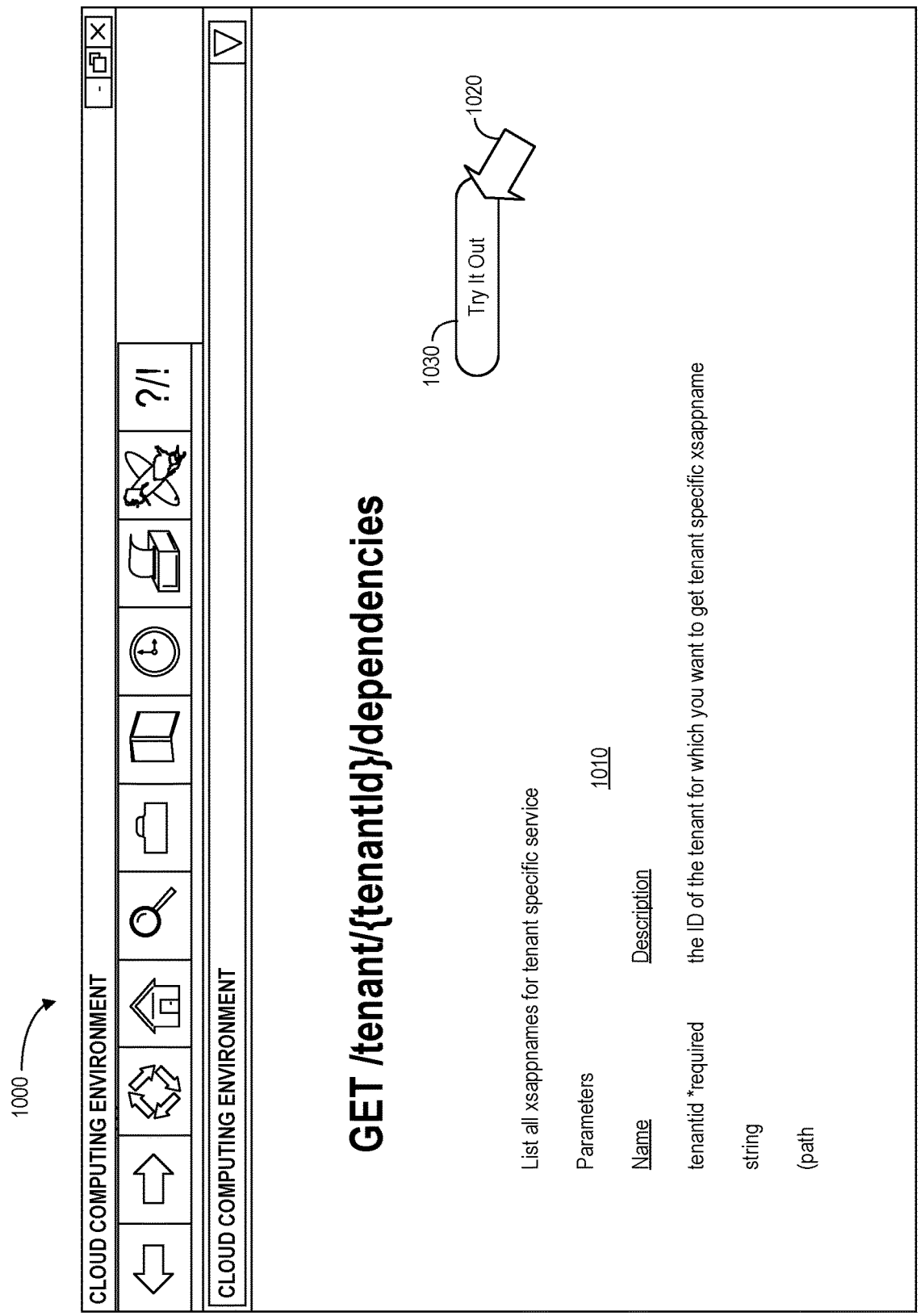
FIG. 10 is an API contract display in accordance with some embodiments.
Figure 11:
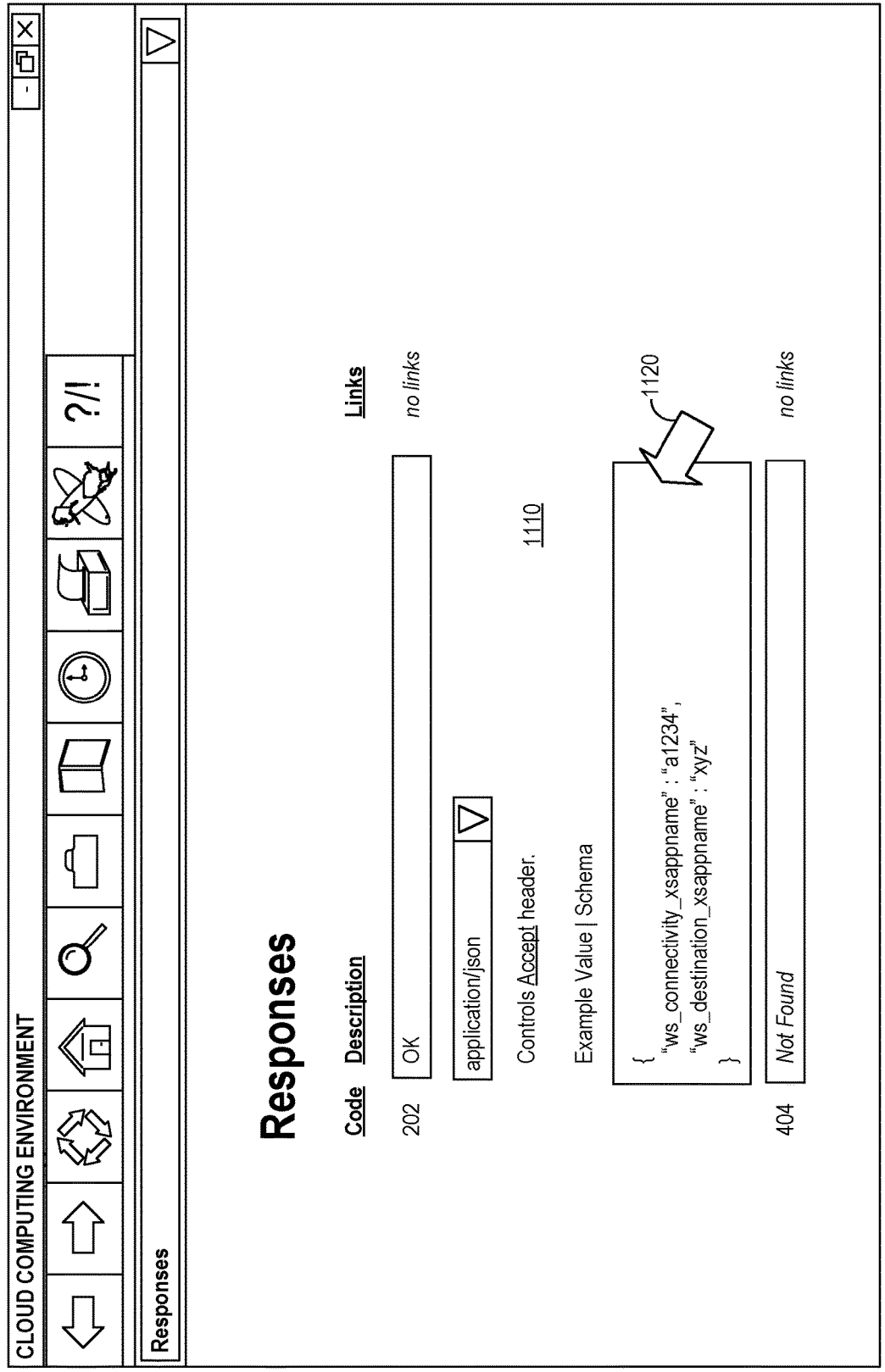
FIG. 11 is a response display according to some embodiments.

The TRM may bind this instance tenant specific instance to a workerset. This would return back a job URL, and the TRM needs to poll the job URL for the status. If the status is FAILED, the system will execute a roll back process. If the status is SUCCESS, the system continues with tenant provisioning. The TRM may need to expose an API to return xsappnames for the connectivity service instance. FIG. 10 is an API contract display 1000 in accordance with some embodiments. The display 1000 may list 1010 all xsappnames for a tenant specific service (including, for example, a name and description). Selection of a "Try It Out" icon 1030 (e.g., via a touchscreen or computer mouse pointer 1020) may result in performance of the API contract. FIG. 11 is a response display 1100 according to some embodiments. The display includes 1100 all potential responses 1110, include the appropriate code, description, and links (if any). Note that a "404" code should be returned when the tenant doesn't exist or provisioning/deprovisioning is in progress. When the tenant does exist but there are no connectivity service instances, then a "200 OK" code should be returned with an empty body.

The provisioning application responsibilities may include updating an extension descriptor of the provisioning application to include the xsappname of the connectivity service instance (bound to a design service). Moreover, the provisioning application may consume the above-mentioned API exposed by the TRM, get the list of dependencies, and return it back to the CIS.

According to some embodiments, a system may support both the CF and NEO platforms in parallel. This may be a challenge with the current approach where everyone implements their way of obtaining proxy information. As a result, there may be a need to abstract the invocation. The following table comprises information about all the scenarios in all possible application and the mechanism used by them and the team responsible as off the date, the page is created.

There may be two scenarios associated with a cloud connector, one with principal propagation and one without it. As used herein, the phrase "principal propagation" may refer to a system in which a user authenticated in the sender is propagated to all the on-premise endpoints in the integration flow. It is an authentication configuration that is configured within individual receiver adapters.

The approach in NEO is that, for scenarios that don't need principal propagation (and just needed the host and port details) but in CF the system may needs an additional authorization header as previously described. With principal propagation in NEO, the system might send an additional header populated soon after the sender adapter which (referred to as the principal header). The platform may be responsible for fetching the principal header that is involved.

However, in CF the system may need to reuse the connectivity service to perform the same activity.

An API from the platform called the 'AuthenticationHeaderProvider' might stores this principal, and embodiments may abstract this in the NM layer with the same name. A camel component called pp-util may be responsible for injecting the principal key and value as exchange properties so that all of the on-premise receivers can use it (even if there is a change in the thread context).

Note that the flow of execution for synchronous and asynchronous sender adapters may be different. For asynchronous sender adapters, there mat be a principal propagation preparation interceptor which is responsible for setting the principal to the camel cxf message by taking the AuthenticationHeaderProvider API. The pp-util component then sets the principal from the cxf message to the exchange properties: AuthHeaderName and AuthHeaderValue. In synchronous adapters, there are no interceptors, the camel component talks to the AuthenticationHeaderProvider API and sets the same exchange properties (AuthHeaderName and AuthHeaderValue).

Figure 12:
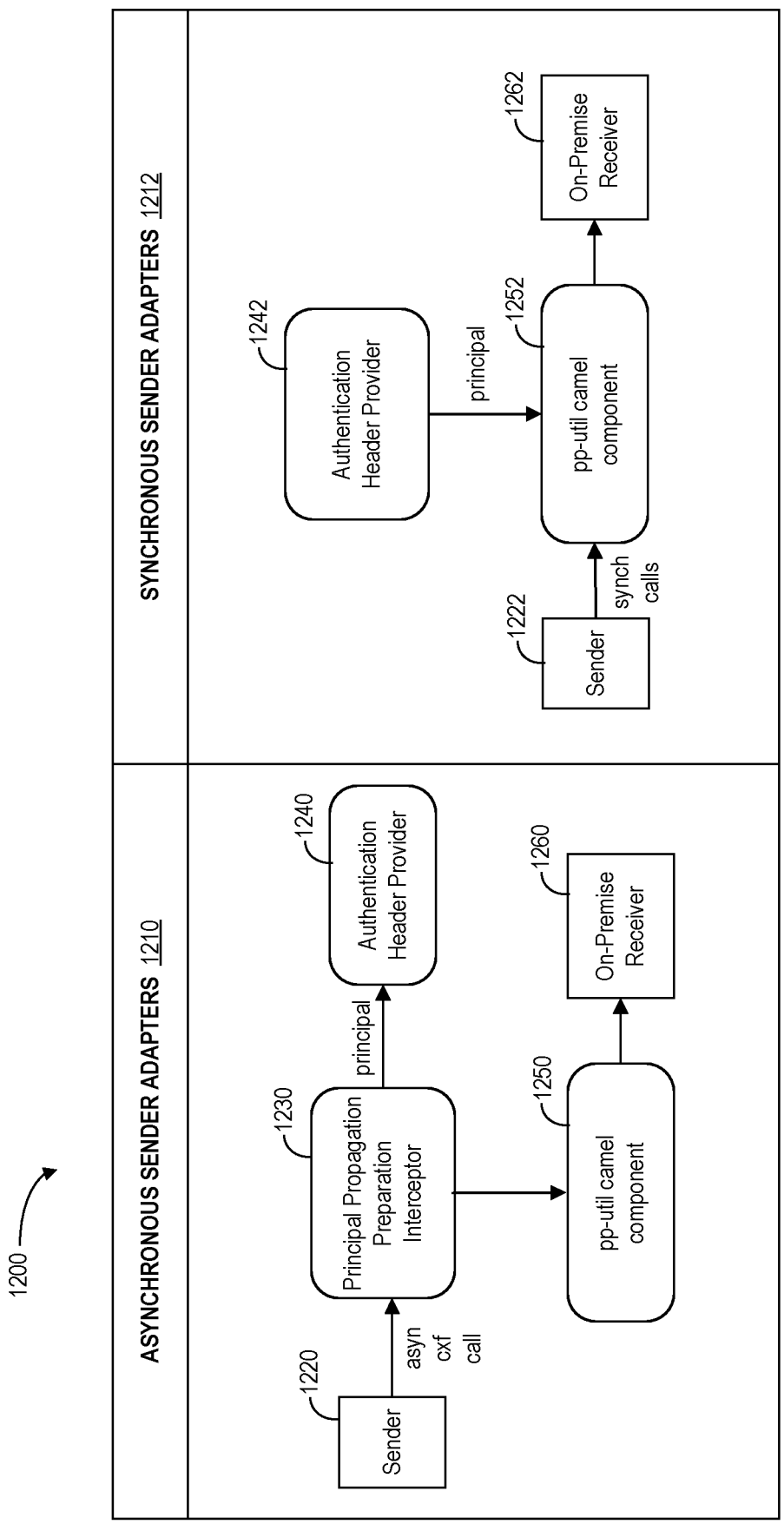
FIG. 12 illustrates sender adapters in accordance with some embodiments.

FIG. 12 illustrates sender adapters 1200 in accordance with some embodiments. In particular, for asynchronous sender adaptors 1210, a sender 1220 sends an asynchronous cxf call to a principal propagation preparation interceptor 1230 (which gets the principal and sets in camel cxf message). The interceptor 1230 is coupled to a pp-util camel component 1250 (which communicates with an on-premises receiver 1260) and sends the principal to an authentication header provider 1240. According to some embodiments, the pp-util camel component 1250 may set the principal from the camel cxf message to exchange properties AuthHeaderName and AuthHeaderValue. For synchronous sender adapters 1212, a sender 1222 sends synchronous calls to a pp-util camel component 1252 (which receives the principal from an authentication header provider 1212) and transmits information to an on-premises receiver 1262. According to some embodiments, the pp-util camel component 1252 may set the principal to exchange properties AuthHeaderName and AuthHeaderValue.

The method for fetching a token (with and without principal propagation) may be different in CF. For example, the former may use the user token to authenticate both the user and the subscriber while the later just checks the establishment of trust with the subscriber. Note that there are two methods of passing the principal in CF:
(1) The application sends two headers to the connectivity proxy:
header: "Connectivity-Authentication": "Bearer <userJwt>"
header: "Proxy-Authorization": "Bearer <accessToken>"
(2) The user exchange access token in proxy-authorization header. In this case, the application sends one header containing the user exchange token to the connectivity proxy:
header: "Proxy-Authorization": "Bearer <userExchangeAccessToken>"
Note that the first approach may pose security risks as the original JavaScript Object Notation ("JSON") Web Token ("JWT") is passed to the cloud connector which is used to access the CPI application. In NEO, the fetching of the token is a call to the platform to get the saved token. However, in CF there is an exchange that happens with two HTTP calls. Solutions might be judged based on various criteria, such as performance, code refactoring, cacheability, execution details, etc.

Figure 13:
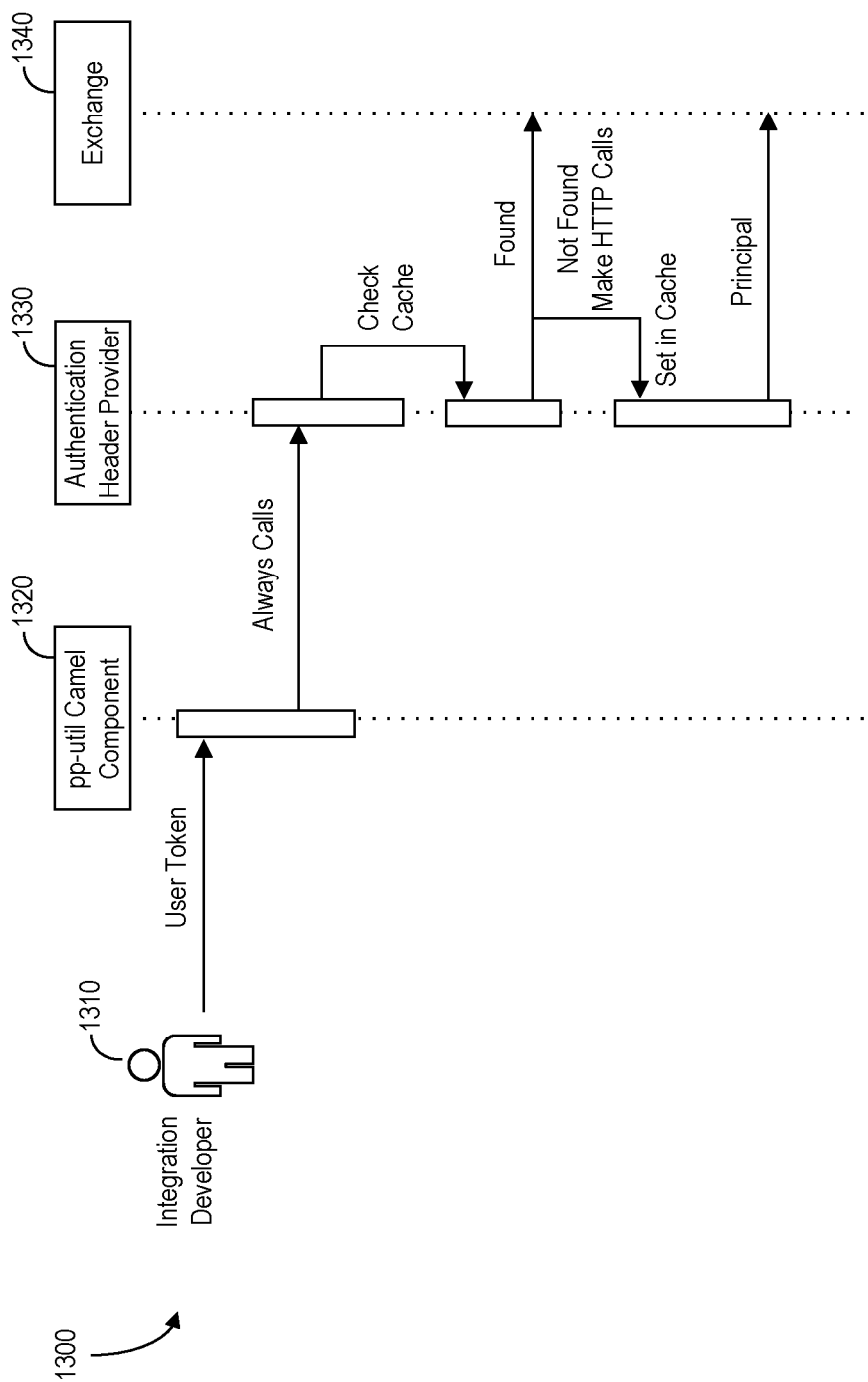
FIG. 13 is a cache principal solution information flow diagram according to some embodiments.

A first solution may cache the principal using the a JWT as a key. In this solution, the system may package a new implementation for fetching the principal in CF (caching each user token with its respective user token). For example, FIG. 13 is a cache principal solution information flow diagram 1300 according to some embodiments. Initially, an integration developer 1310 may provide a user token to a pp-util camel component 1320 which will always call an authentication header provider 1330. The authentication header provider 1330 may check a cache, and if it found communicate with an exchange 1340. If it is not found, the authentication header provider 1330 may make HTTP calls, set information in the cache, and eventually send the principal to the exchange 1340. As in NEO, when a sender is triggered the camel component 1320 may take over. The processor will always call a CF specific "AuthenticationHeaderProvider" and save the principal in the cache using the user token as key. With solution, no refactoring may be required but performance of scenarios without principal propagation may be impacted.

Figure 14:
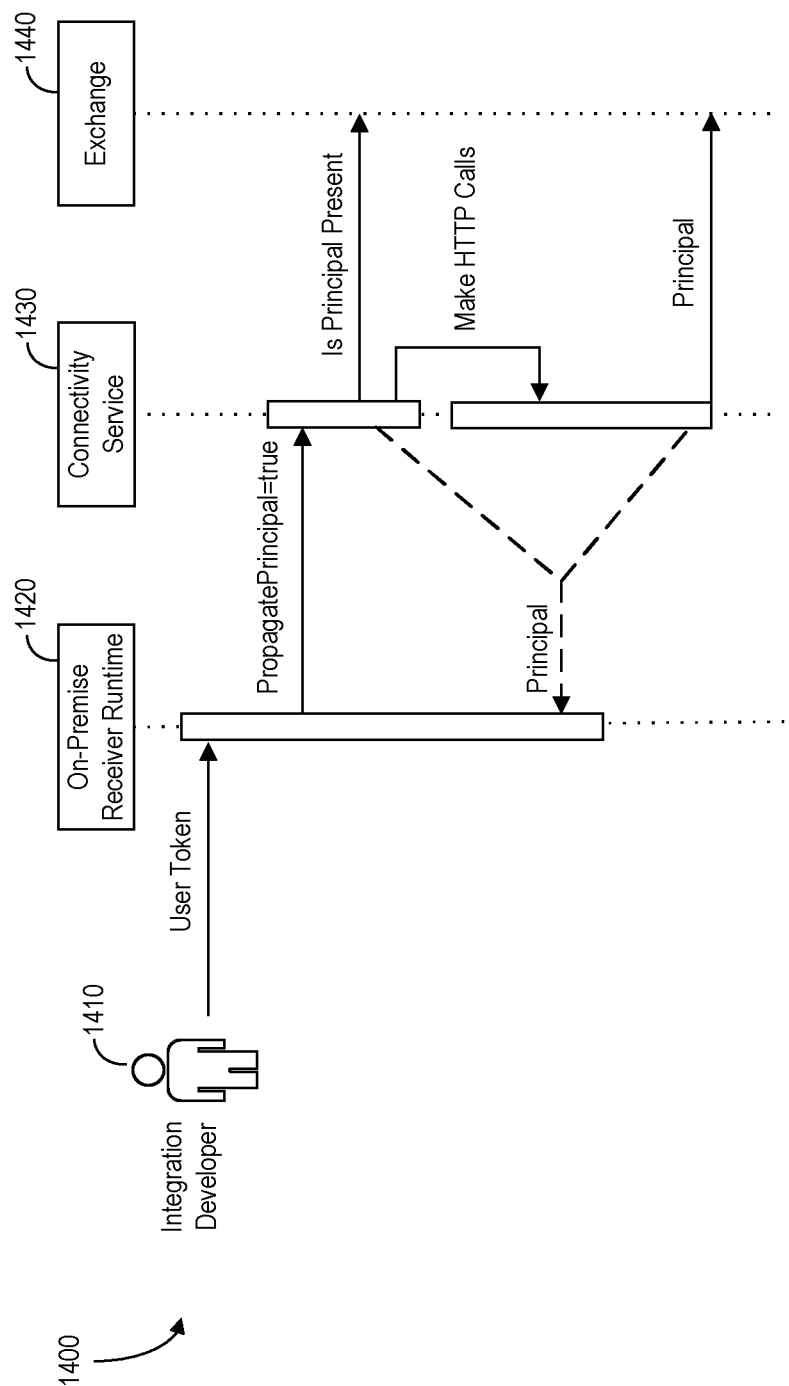
FIG. 14 is an abstraction layer solution information flow diagram in accordance with some embodiments.

A second solution may use abstraction layer to get the principal. Such a solution may use an existing ConnectivityServiceProvider to get the connectivity service with a connectivity parameter PropagatePrincipal set to true. In addition, the exchange may be also passed as a parameter. For example, FIG. 14 is an abstraction layer solution information flow diagram 1400 in accordance with some embodiments. Initially, an integration developer 1410 may provide a user today to an on-premise receiver runtime 1420. The on-premise receiver runtime 1420 sends PropagatePrincipal="true" to a connectivity service 1430. If the principal is present, data is sent to an exchange 1440. Otherwise, HTTP calls are made and the connectivity service 1430 sends the principal to the exchange 1440. In either case, the connectivity service 1430 also sends the principal to the on-premises receiver runtime 1420. Note that irrespective of the kind of sender, only when the receiver needs the principal will it be fetched, once the principal is fetched it will be cached in exchange property, and there is no need of a pp-util component. An advantage if this solution is that the principal is fetched only when required. Drawbacks of this solution may include the fact that the thread context might be lost at the receiver and the system may need to keep track of the parent exchange in case of multiple routes.

Figure 15:
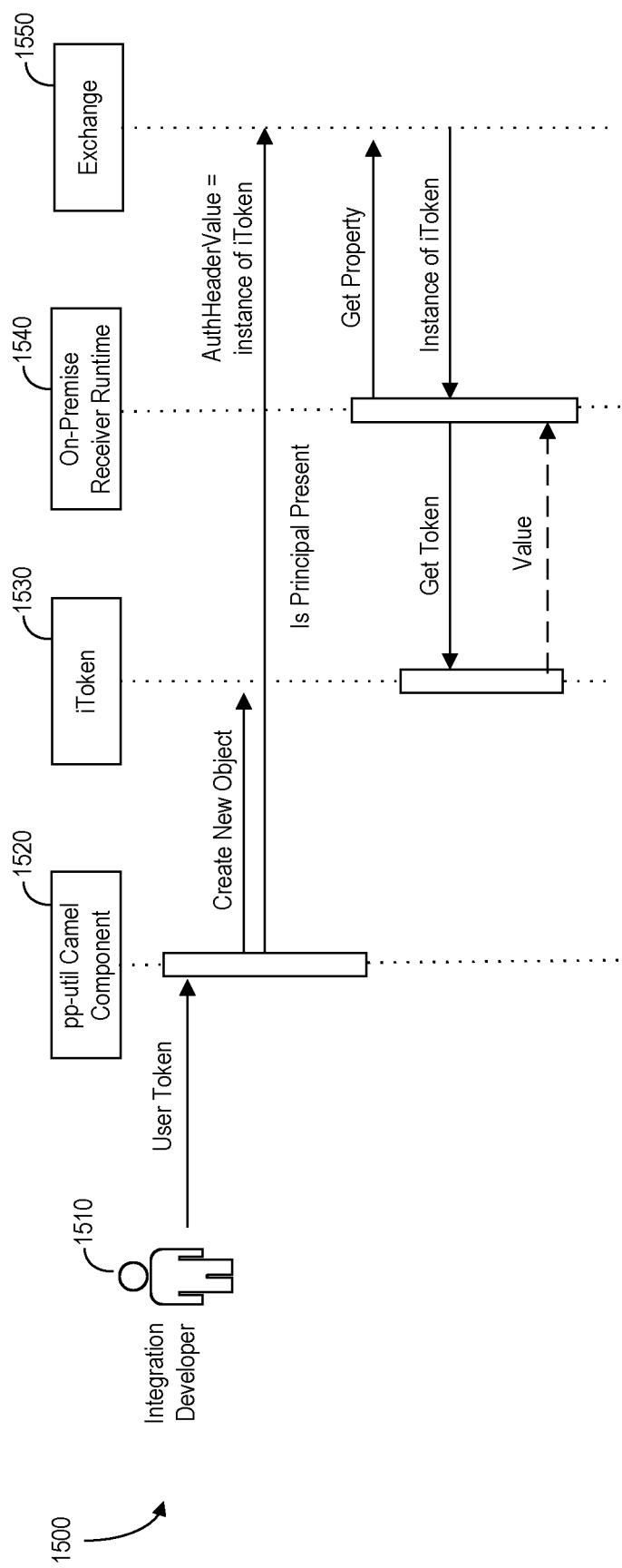
FIG. 15 is a pp-util component change solution information flow diagram according to some embodiments.

A third solution may change the pp-util component. Note that other approaches may only save exchange properties (AuthHeaderName and AuthHeaderValue) which contain only string values. In this solution, the system may make the value of property AuthHeaderValue as an instance of class iToken. For example, FIG. 15 is a pp-util component change solution information flow diagram 1500 according to some embodiments. An integration developer 1510 may send a user token to a pp-util camel component 1520. The pp-util camel component 1520 will create a new object via iToken 1530 and set AuthHeaderValue equal to the instance of the iToken for an exchange 1530. An on-premise receiver runtime 1540 may then get a property from the exchange 1550 and receive an instance of the iToken in response. The on-premise receiver runtime 1540 may then get an iToken 1530 and receive the appropriate value in return.

At the pp-util camel component 1520, the system may create an instance of class "iToken" and this layer may set exchange property, AuthHeaderName to the necessary value (and also save the user token from the security context in the case of CF and principal header from AuthenticationHeaderProvider API from the platform in the case of NEO). The exchange property AuthHeaderValue will have this instance of iToken 1530. When the on-premise receiver runtime 1540 receives the call, it should cast the exchange property, AuthHeaderValue to iToken 1530 and call method 'getPrincipalToken' on which he required HTTP calls are made (and save it in the instance). According to some embodiments, these HTTP calls are synchronized to avoid multiple thread who are trying to fetch the JWT. On further calls to the method 'getPrincipalToken,' the system may return the principal token saved in that instance. Some advantages to this solution are that that thread context will be retained, and a lazy fetching principal may be employed when its required. A disadvantage may be that refactoring by all adapters may be needed using principal propagation.

Figure 16:
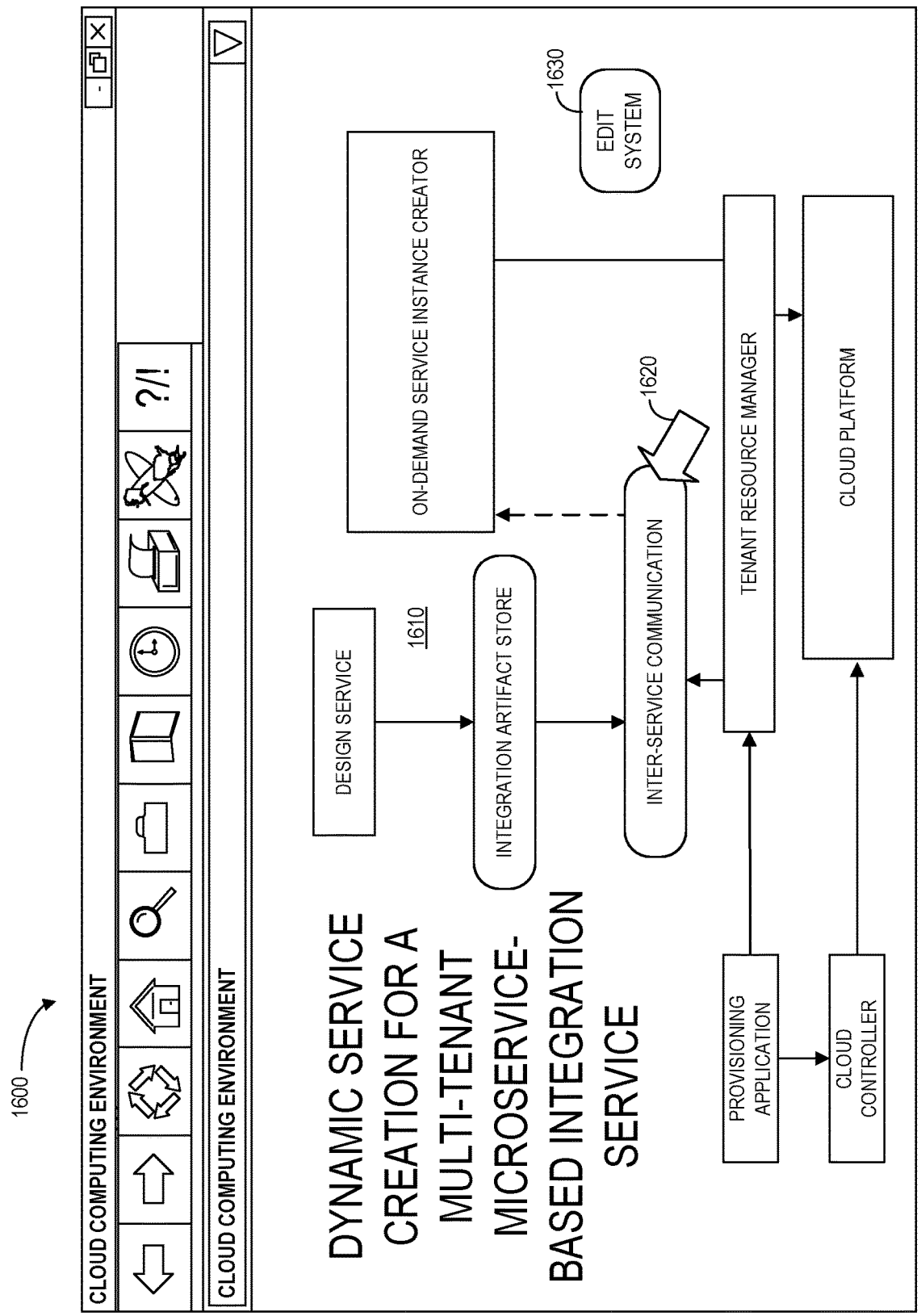
FIG. 16 is a human machine interface display according to some embodiments.

FIG. 16 is a human machine interface display 1600 in accordance with some embodiments. The display 1600 includes a graphical representation 1610 of a provisioning system in accordance with any of the embodiments described herein. Selection of an element on the display 1600 (e.g., via a touch-screen or a computer pointer 1620) may result in display of a pop-up window containing more detailed information about that element and/or various options (e.g., to add a microservice, modify an item in an integration artifact data store, etc.). Selection of an "Edit System" icon 1630 may also let an operator or administrator adjust the operation of the provisioning system.

Figure 17:
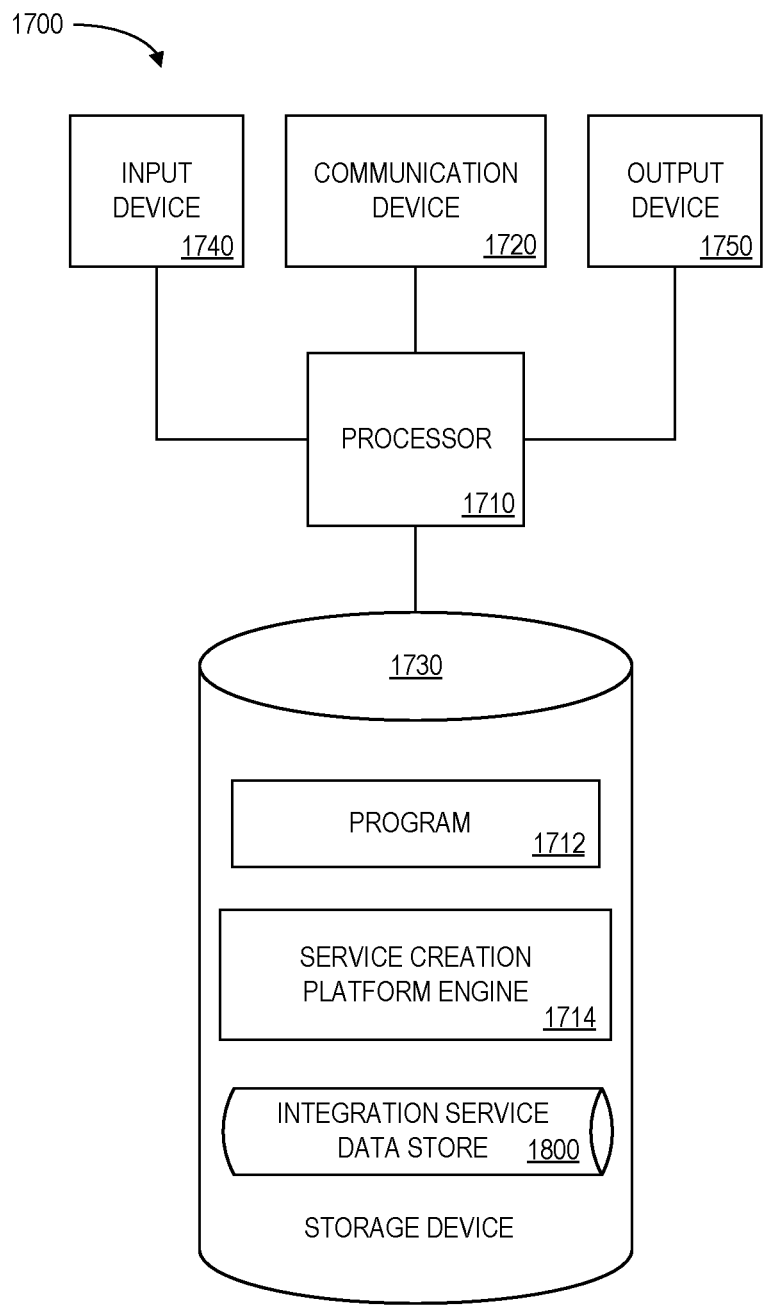
FIG. 17 is an apparatus or platform according to some embodiments.

Note that the embodiments described herein may also be implemented using any number of different hardware configurations. For example, FIG. 17 is a block diagram of an apparatus or platform 1700 that may be, for example, associated with the systems 100, 400 of FIGS. 1 and 4, respectively (and/or any other system described herein). The platform 1700 comprises a processor 1710, such as one or more commercially available Central Processing Units ("CPUs") in the form of one-chip microprocessors, coupled to a communication device 1760 configured to communicate via a communication network (not shown in FIG. 17). The communication device 1760 may be used to communicate, for example, with one or more remote user platforms, administrator platforms, etc. The platform 1700 further includes an input device 1740 (e.g., a computer mouse and/or keyboard to input microservice and integration service information) and/an output device 1750 (e.g., a computer monitor to render a display, transmit recommendations, and/or create reports about integration services, tenants, users, etc.). According to some embodiments, a mobile device, monitoring physical system, and/or PC may be used to exchange information with the platform 1700.

The processor 1710 also communicates with a storage device 1730. The storage device 1730 may comprise any appropriate information storage device, including combinations of magnetic storage devices (e.g., a hard disk drive), optical storage devices, mobile telephones, and/or semiconductor memory devices. The storage device 1730 stores a program 1712 and/or a service creation platform engine 1714 for controlling the processor 1710. The processor 1710 performs instructions of the programs 1712, 1714, and thereby operates in accordance with any of the embodiments described herein. For example, the processor 1710 may receive model integration content from an integration developer in connection with a cloud computing environment and at least one integration service may be determined associated with the received model integration content. The processor 1710 may then automatically and dynamically instantiate the at least one integration service on demand during a provisioning process. Moreover, the processor 1710 may also automatically subscribe the at least one integration service during the provisioning process. Similarly, at least one integration service to be consumed for the received model integration content may be determined by processor 1710. The processor 1710 may then automatically instantiate the at least one integration service on demand during a consumption process. In this case, the processor 1710 might automatically subscribe the at least one integration service during the consumption process.

The programs 1712, 1714 may be stored in a compressed, uncompiled and/or encrypted format. The programs 1712, 1714 may furthermore include other program elements, such as an operating system, clipboard application, a database management system, and/or device drivers used by the processor 1710 to interface with peripheral devices.

As used herein, information may be "received" by or "transmitted" to, for example: (i) the platform 1700 from another device; or (ii) a software application or module within the platform 1700 from another software application, module, or any other source.

In some embodiments (such as the one shown in FIG. 17), the storage device 1730 further stores an integration service data store 1800. An example of a database that may be used in connection with the platform 1700 will now be described in detail with respect to FIG. 18. Note that the database described herein is only one example, and additional and/or different information may be stored therein. Moreover, various databases might be split or combined in accordance with any of the embodiments described herein.

Figure 18:
FIG. 18 is portion of an integration service data store in accordance with some embodiments.

Referring to FIG. 18, a table is shown that represents the integration service data store 1800 that may be stored at the platform 1700 according to some embodiments. The table may include, for example, entries associated with users in a cloud computing environment. The table may also define fields 1802, 1804, 1806, 1808, 1810 for each of the entries. The fields 1802, 1804, 1806, 1808, 1810 may, according to some embodiments, specify: a user identifier 1802, a tenant identifier 1804, an integration service identifier 1806, microservices 1808, and subscription 1810. The integration service data store 1800 may be created and updated, for example, when new users or tenants are added to a system, new integration services are deployed, etc.

The user identifier 1802 might be a unique alphanumeric label that is associated with a user who may request an integration service associated with a cloud computing environment. The tenant identifier 1804 may represent an enterprise, group of users, etc. who utilize the cloud computing environment. The integration service identifier 1806 may define an application (e.g., a payroll or human resources application) composed of a number of different microservices 1808. The subscriptions 1810 might comprise or indicate subscriptions that have been automatically arranged during a provisioning process (e.g., via a provisioning application and/or cloud controller).

Thus, embodiments may provision an application of a multi-tenant, microservice architecture-based integration service associated with a cloud computing environment setup in a secure, automatic, and efficient manner. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of integration services and microservices, any of the embodiments described herein could be applied to other types of applications. Moreover, the displays shown herein are provided only as examples, and any other type of user interface could be implemented.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system, comprising:
a cloud platform associated with a microservice-based multi-tenant cloud computing environment;
an on-demand service instance creator;
a tenant resource manager coupled between the cloud platform and the on-demand service instance creator; and
a provisioning application platform, coupled to the tenant resource manager, including:
a computer processor, and
computer memory, coupled to the computer processor, storing instructions that, when executed by the computer processor cause the processor to:
(i) receive model integration content from an integration developer via a user interface design service, associated with a first tenant, in connection with the cloud computing environment, wherein the model integration content is associated with an application to be executed for the first tenant,
(ii) determine at least one integration service associated with the received model integration content,
(iii) automatically and dynamically arrange for the on-demand service instance creator to instantiate the at least one integration service in the cloud platform during a provisioning process in accordance with the tenant resource manager, and
(iv) automatically subscribe the at least one integration service during the provisioning process, wherein the user interface design service and a runtime artifact generation service are used by an integration artifact store to generate deploy and un-deploy consumption notifications for the tenant resource manager via inter-service communications.

2. The system of claim 1, wherein the at least one integration service is further determined based on the on-demand service instance creator.

3. The system of claim 2, wherein the on-demand service instance creator includes a service identifier and service name contributors.

4. The system of claim 1, wherein a cloud controller, coupled between the provisioning application platform and the cloud platform, automatically handles at least one subscription for the at least one integration service.

5. A system, comprising:
a cloud platform associated with a microservice-based multi-tenant cloud computing environment;
an on-demand service instance creator;
a tenant resource manager coupled between the cloud platform and the on-demand service instance creator; and
a provisioning application platform, coupled to the tenant resource manager, including:
a computer processor, and
computer memory, coupled to the computer processor, storing instructions that, when executed by the computer processor cause the processor to:
(i) receive model integration content from an integration developer via a user interface design service, associated with a first tenant, in connection with the cloud computing environment, wherein the model integration content is associated with an application to be executed for the first tenant,
(ii) determine at least one integration service to be consumed for the received model integration content,
(iii) automatically and dynamically arrange for the on-demand service instance creator to instantiate the at least one integration service during a consumption process in accordance with the tenant resource manager, and
(iv) automatically subscribe the at least one integration service during the consumption process, wherein the user interface design service and a runtime artifact generation service are used by an integration artifact store to generate deploy and un-deploy consumption notifications for the tenant resource manager via inter-service communications.

6. The system of claim 5, wherein the at least one integration service is associated with at least one of: (i) another cloud computing environment, or (ii) an on-premises system of the first tenant.

7. A computer-implemented method, comprising:
receiving, at a provisioning application platform, model integration content from an integration developer via a user interface design service, associated with a first tenant, in connection with a cloud platform associated with a microservice-based multi-tenant cloud computing environment, wherein the model integration content is associated with an application to be executed for the first tenant;
determining at least one integration service associated with the received model integration content;
automatically and dynamically arranging for an on-demand service instance creator to instantiate the at least one integration service in the cloud platform during a provisioning process in accordance with a tenant resource manager coupled between the cloud platform and the on-demand service instance creator; and
automatically subscribing the at least one integration service during the provisioning process, wherein the user interface design service and a runtime artifact generation service are used by an integration artifact store to generate deploy and un-deploy consumption notifications for the tenant resource manager via inter-service communications.

8. The method of claim 7, wherein the provisioning process is associated with tenant resource manager.

9. The method of claim 7, wherein a cloud controller, coupled between the provisioning application platform and a cloud platform, automatically handles at least one subscription for the at least one integration service.

10. A computer-implemented method, comprising:
receiving, at a provisioning application platform, model integration content from an integration developer via a user interface design service, associated with a first tenant, in connection with a cloud platform associated with a microservice-based multi-tenant cloud computing environment, wherein the model integration content is associated with an application to be executed for the first tenant;
determining at least one integration service to be consumed for the received model integration content, wherein the at least one integration service to be consumed for the received model integration content is associated with another cloud computing environment;
automatically and dynamically arranging for an on-demand service instance creator to instantiate the at least one integration service in the cloud platform during a consumption process in accordance with a tenant resource manager coupled between the cloud platform and the on-demand service instance creator; and
automatically subscribing the at least one integration service during the consumption process, wherein the user interface design service and a runtime artifact generation service are used by an integration artifact store to generate deploy and un-deploy consumption notifications for the tenant resource manager via inter-service communications.

* * * * *